US008781676B2

(12) United States Patent
McIntyre, Jr. et al.

(10) Patent No.: US 8,781,676 B2
(45) Date of Patent: Jul. 15, 2014

(54) PHOTO-ELECTROCHROMIC WINDOW TINTER

(75) Inventors: William E. McIntyre, Jr., Walworth, WI (US); Jerremy H. Anderson, Arlington Heights, IL (US); Tod R. Whitmore, River Forest, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 248 days.

(21) Appl. No.: 13/327,893

(22) Filed: Dec. 16, 2011

(65) Prior Publication Data

US 2013/0158790 A1  Jun. 20, 2013

(51) Int. Cl.
 *G02B 26/02* (2006.01)
(52) U.S. Cl.
 USPC ............................................ 701/36; 296/211
(58) Field of Classification Search
 USPC ............ 701/36; 359/227, 228, 244, 601–605, 359/738, 885; 296/211–215, 96.19
 See application file for complete search history.

(56) References Cited

U.S. PATENT DOCUMENTS

| 6,465,963 | B1 * | 10/2002 | Turnbull et al. | 315/82 |
| 6,501,387 | B2 * | 12/2002 | Skiver et al. | 340/815.4 |
| 6,528,782 | B1 * | 3/2003 | Zhang et al. | 250/226 |
| 8,482,834 | B2 * | 7/2013 | Cordova | 359/228 |
| 2003/0210355 | A1 * | 11/2003 | Dao | 349/16 |

FOREIGN PATENT DOCUMENTS

WO   00/49680 A1   8/2000

* cited by examiner

*Primary Examiner* — Dalena Tran

(57) ABSTRACT

An electrically-adjustable light transmitter changes its light transmissivity responsive to an electric signal. By applying the electrically-adjustable light transmitter to a window and thereafter changing the electric signal to it, a window can be tinted and un-tinted. Jurisdictions that prohibit tinted vehicle windows are listed in a data base. A current location determined by a GPS is compared to data base entries. If the location is within an area where tinted windows are prohibited, a controller automatically un-tints the windows, or reduces the window tint to comply with applicable local laws.

22 Claims, 4 Drawing Sheets

PHOTO-ELECTROCHROMIC WINDOW TINTER

BACKGROUND

Tinted vehicle windows are well known to reduce solar heating of a vehicle. Since they reduce the amount of ultraviolet and infrared that enters a vehicle's interior they also tend to protect the materials from which dashboards and interior surfaces are made. Unfortunately, window tinting can obscure or reduce a driver's ability to see and they are known by law enforcement to conceal the interior of a vehicle. Some states, counties, and municipalities prohibit tinted windows of any kind while other jurisdictions specify or define the maximum tinting or opacity that vehicle window glass can have. If a vehicle owner applies window tinting to a vehicle that is permitted by local ordinances but prohibited by the ordinances of surrounding jurisdictions, the vehicle owner risks being cited by law enforcement agencies in jurisdictions where vehicle window tinting is prohibited.

DETAILED DESCRIPTION

Figure 1:
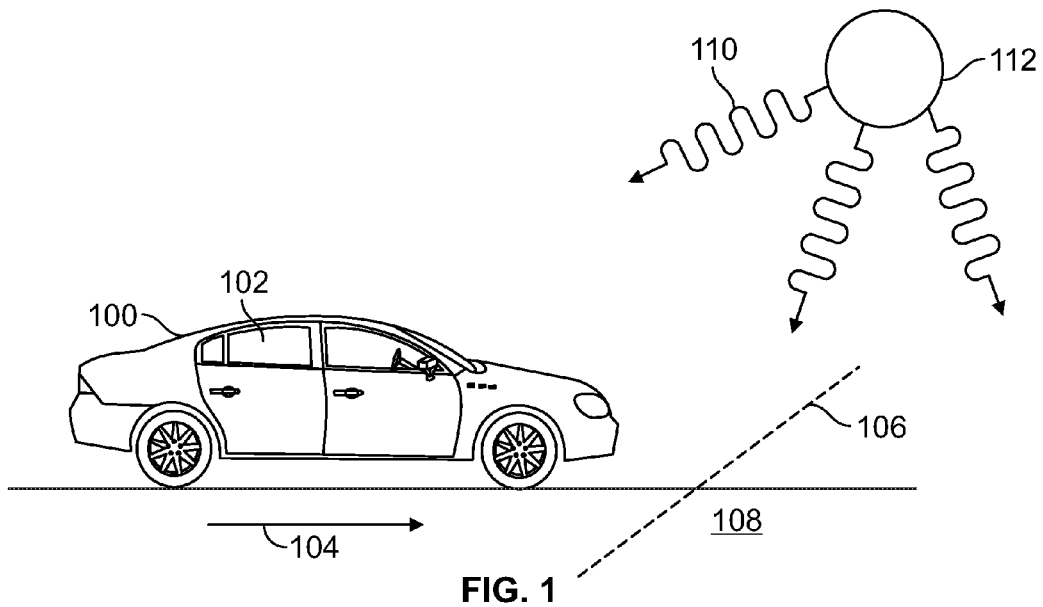
FIG. 1 depicts a motor vehicle with tinted windows leaving a jurisdiction where such windows are legal and entering a second jurisdiction where they are prohibited.

FIG. 1 is a graphical depiction of a motor vehicle 100 having tinted windows 102 in a first jurisdiction 104, and which is about to cross a boundary line 106 into a second jurisdiction 108. Tinted windows are lawful in the first jurisdiction 104; they are prohibited in the second jurisdiction 108. Prior art window tinting methods make it impractical or even impossible to tint and un-tint windows to provide the beneficial effects of tinted windows 102 where they are not prohibited yet avoid running afoul of state or local laws that prohibit them.

Figure 2A:
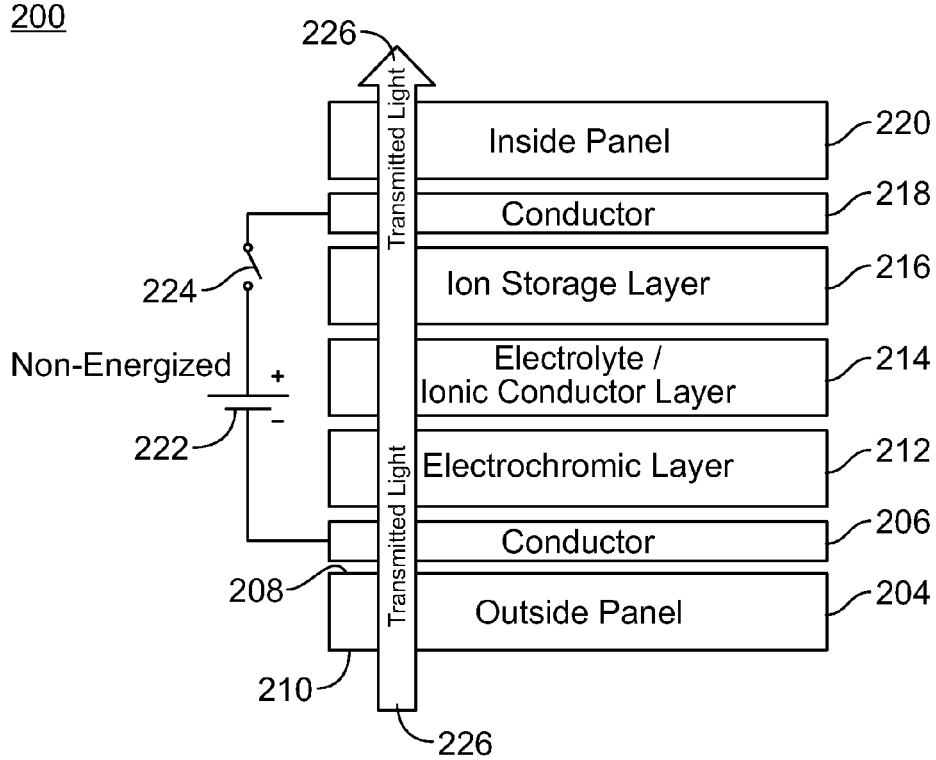
FIGS. 2A and 2B depict an electrically-adjustable light transmitter, which can be applied to window glass.
Figure 2B:
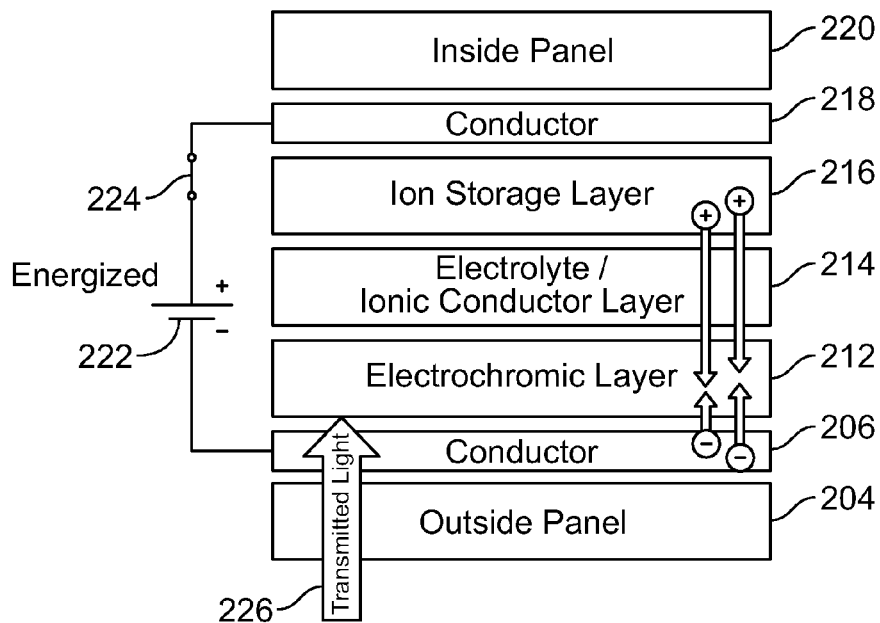

FIGS. 2A and 2B are cross-sections of an electrically-adjustable light transmitter commonly known as an electrochromic device 200. It is comprised of layers, which can be conformably attached to either side of a sheet of glass, or sandwiched between two layers as depicted in FIGS. 2A and 2B.

The structure in FIGS. 2A and 2B is comprised of two glass panels. The layers sandwiched between them provide an electrically-adjustable transmissivity or "tint." A control voltage applied to an elecrochromic layer determines the amount of light that can pass through it.

An outside glass panel 204 has first and second opposing surfaces 208 and 210. An optically transparent conductor layer 206 is applied to the inside surface 208 of the outside panel 204.

An electrochromic layer 212 is applied over the transparent conductor layer 206. The electrochromic layer 212 is characterized by its ability to pass or block visible light responsive to the application or absence of a voltage. Stated another way, the electrochromic layer will block light when an electric potential is applied across the layer An electrolyte/ionic conductor layer 214 is applied over the electrochromic layer 212. An ion storage layer 216 is applied over the electrolyte/ionic conductor layer 214. A second transparent conductor layer 218 is then applied over the ion storage layer 216. The interior layers 206-218 are then sandwiched by a second glass panel 220 which faces the interior of the vehicle. It is important to note that the location of the electrochomic layer 212 relative to the electrolyte/ionic conductor layer 214 can be reversed and the device 200 kept operable. A depiction of such an alternate embodiment, i.e., wherein the location of layers 214 and 216 are interchanged with each other, is omitted for brevity.

An electric energy source 222 can be selectively applied to and removed from the two conductors 206 and 218 by a conventional switch mechanism 222. In another embodiment, the strength of the field and/or the amount of current passing through the layer 212 can be controlled by a conventional voltage source or current source respectively.

In FIG. 2A, the electrochromic device is not energized. Light rays 226 are thus free to pass through the electrochromic layer.

FIG. 2B depicts the electrochromic device in an energized state. A voltage is applied to the electrochromic layer by the closure of a conventional switch 224. While light 226 passes through the outside panel 204 and the first conductor layer 206, light is blocked by the biased electrochromic layer 212. The opacity and the tint of the device 200 can thus be electrically adjusted by an electric signal or voltage applied to the electrochromic layer.

Figure 3:
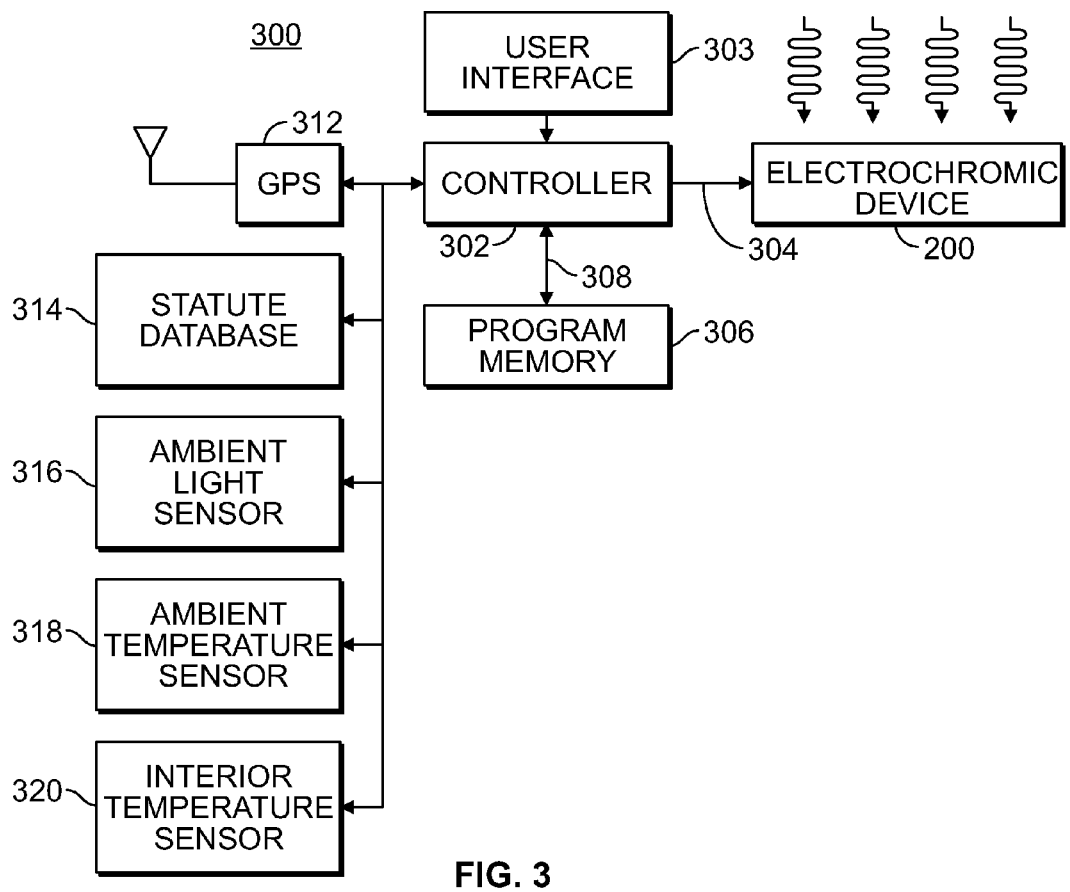
FIG. 3 depicts a block diagram of a geographic location-responsive window tinting system.

FIG. 3 is a block diagram of a photo-electrochromic window tinter, also referred to herein as an electrically-operable window tinting system 300. The system 300 is comprised of an electrochromic device 200, such as the one depicted in FIG. 2. A stored program controller 302 provides a control voltage 304 to the electrochromic device 200 responsive to program instructions stored in an associated memory device 306 and various events and conditions detected by various sensors attached to the controller 302. The controller 302 is coupled to the various sensors via a conventional input/output (I/O) bus 310. The controller 302 and the memory device 306 are coupled to each other via a conventional memory bus.

The controller is depicted as being coupled to a separate memory device 314 that holds a window tinting rules database 314. The database 314 is a list of geographic areas, each of which is defined by latitude and longitudinal coordinates, inside of which, there is at least one statute or law, rule, ordinance governing vehicle window tinting.

The controller is also coupled to an ambient light sensor 316, an exterior ambient temperature sensor 318 and a vehicle interior temperature sensor 320, which are useful in other applications of the photo-electrochromic window tinter.

In a first embodiment, of the photo-electrochromic window tinter 300, the controller 302 queries the GPS receiver 312 for geographic coordinates, i.e., a location of where the vehicle is located. The location of the tinter or a vehicle it is attached to is provided to the controller in latitude and longitude coordinates. The controller 302 thereafter queries the window tinting rules database 314 to determine whether the current location of the vehicle is inside of a jurisdiction where tinted windows are prohibited, or if there is a tinted window opacity specification, i.e., a rule or law that dictates the darkness or degree to which a window tint passes light, which needs to be complied with.

In a second embodiment, which is useful for all vehicles but especially useful to electrically-powered vehicles, the controller 302 queries the ambient light sensor, ambient temperature sensor, and/or the interior temperature sensor 320 to adjust the tinting on the electrochromic device 200 to optimize interior temperatures responsive to interior and exterior conditions.

Figure 4:
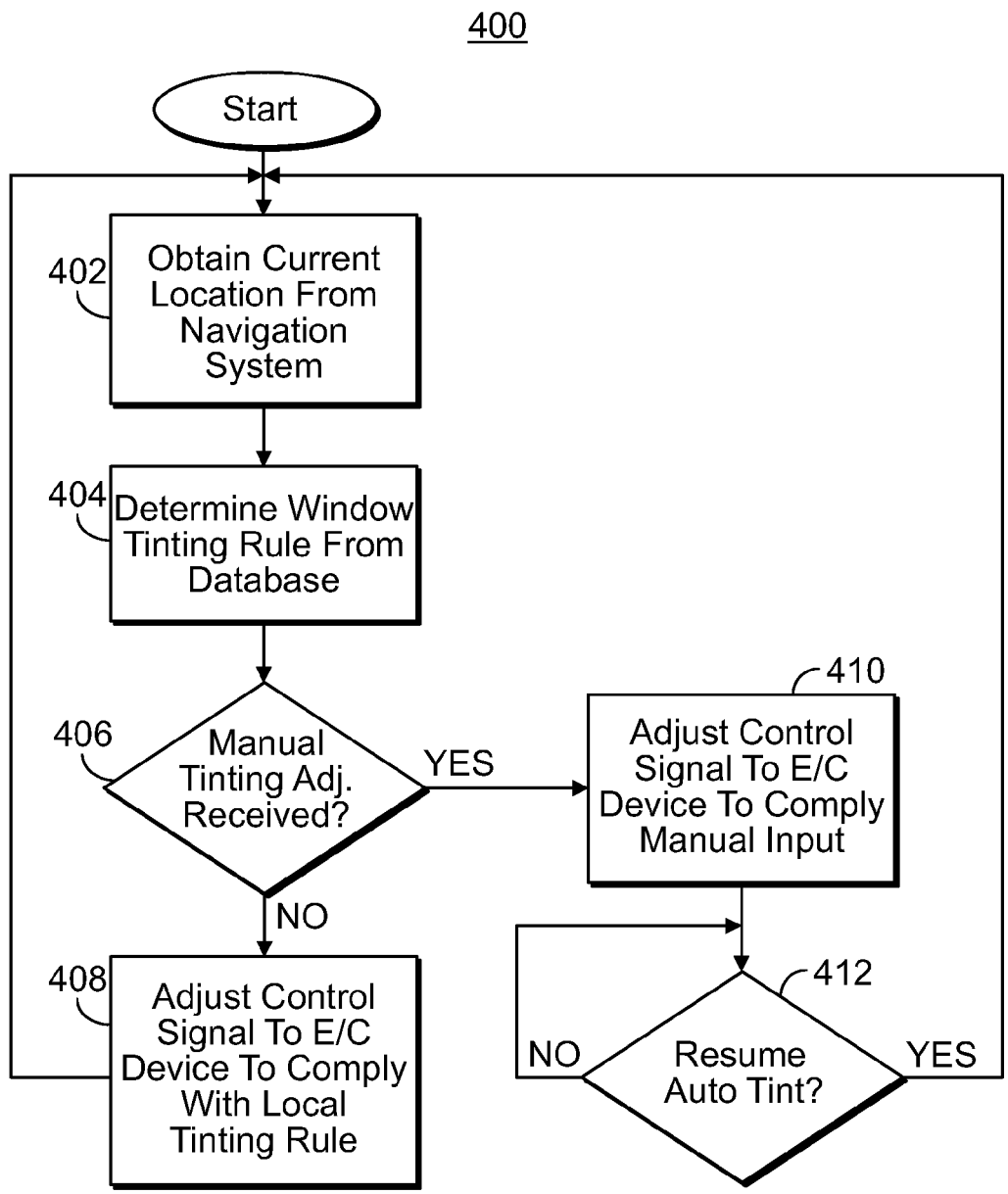
FIG. 4 is a flowchart of a method of adjusting a window tint responsive to a geographic location.

FIG. 4 depicts a method 400 of adjusting a window tint responsive to a geographic location. A method is performed by a controller or computer such as the controller 302 depicted in FIG. 3 and described above.

At step 402, the controller obtains its current location from a navigation system such as the GPS system 312 depicted in FIG. 3. Once the location is obtained from the GPS, a database is consulted at step 404 to determine or locate window tinting rules that apply to where the vehicle is located. As used herein, a window tinting rule is a statute or ordinance or other law or regulation that defines the tint that can be applied to a vehicle window including whether tinting is prohibited.

At step 406 the method first checks to determine whether a manual tinting input command has been received by the controller 302 from a manual user interface 303. If a manual tinting adjustment command has been received, the method proceeds to step 410 where the window tint is manually adjusted by the controller providing an appropriate voltage to an electrically-adjustable light transmitting device, such as the electrochromic device depicted in FIG. 2. The method stays in a manual tinting mode at step 412 until the user inputs a command to the user interface to allow the system to resume an auto tint function whereupon the method returns to step 402.

If no manual tinting adjustment command has been received at step 406, the method proceeds to step 408 where the controller issues appropriate electrical signals to the electrically-adjustable light transmitter to comply with the tinting rule obtained from the database at step 408. After the tinting is adjusted to conform to any applicable rule, the method returns to step 402. The method 400 of adjusting window tint thus continuously checks where the vehicle is located and whether there are any applicable tinting rules and adjusts the window tint accordingly. The system 300 depicted in FIG. 3 has sensors that can be monitored to determine how and when to adjust the opacity or transmissivity of a window responsive to other external events or conditions. The method depicted in FIG. 4 can thus include a step of reading an ambient light sensor, an exterior ambient temperature sensor or an interior temperature sensor and adjusting the window tint electrically in order to provide a desired interior temperature, or to reduce heating and cooling load on an electric power source of an all-electric vehicle.

Figure 5:
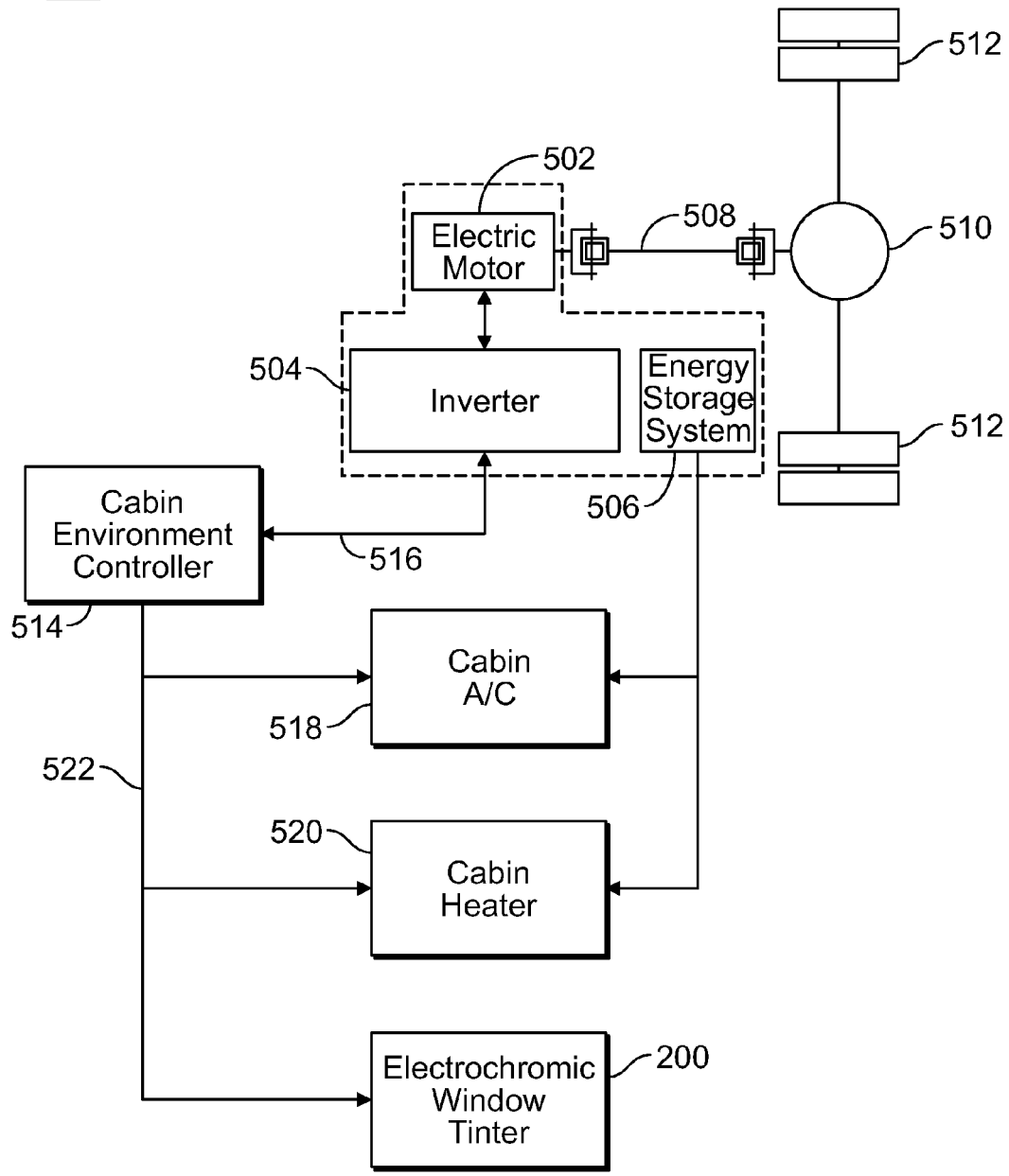
FIG. 5 depicts the use of an electrically-controllable window tinting mechanism in an all-electric vehicle.

FIG. 5 is a block diagram of an electrically-powered vehicle 500. The vehicle is considered to be "electrically-powered." The vehicle 500 is comprised of an electric motor 502 powered by an inverter 504. The inverter 504 provides power to the motor that it receives from a battery, fuel cell or other source of electric energy 506. Motive power from the electric motor 504 is delivered through a drive shaft 508 to a differential 510, front-located or rear-located, which is coupled to drive wheels 512.

Since the vehicle 500 is all-electric, cabin environment conditions are also controlled using electric energy from the energy storage system 506. Those of ordinary skill in the art will recognize that large amounts of energy are required to provide heat and to cool the interior of a vehicle. In an all-electric vehicle, reducing the power required to provide heat or to drive a refrigeration system is important.

In FIG. 5, a cabin environment controller 514 receives signals 516 from the inverter 504 and the energy storage system 506 in order to determine the energy capacity remaining in the energy storage system 506. The cabin environment controller 514 is also coupled to an electrically-operated cabin air conditioner (A/C) 518 and to an electrically operated cabin heater 520 via a conventional control bus 522. When the cabin interior temperature gets too high, the cabin environment controller 514 sends a signal to the electrically-driven air conditioner 518 to turn it on causing the A/C 518 to draw electric energy from the energy storage system 506 in the process. Conversely, when the cabin interior temperature is too low the environment controller 514 energizes electrically resistive heating elements in the cabin heater 520, which also draws power from the energy storage system 506.

An advantageous feature of the all-electric vehicle depicted in FIG. 5 is the provision of the electrochromic window tinter 200 and the photo-electrochromic system 300 depicted in FIG. 3. When interior cabin temperatures require the air conditioning system 518 to be energized, the cabin environment controller 514 issues commands to either an electrochromic window tinter 200 itself, or to a separate photo-electrochromic system 300, either of which maximizes the window tinting opacity in order to minimize the amount of infrared energy entering the vehicle from the Sun 112. Similarly, when the cabin temperatures require heat to be added, i.e., cabin heating is required, the cabin environment controller 514 issues commands to either an electrochromic window tinter 200 itself, or to a separate photo-electrochromic system 300, either of which minimizes the window tinting opacity in order to maximize the amount of infrared energy entering the vehicle from the Sun 112. The electrochromic window tinter 200 can thus significantly reduce the energy required from a battery or other limited power source in an all electric vehicle.

In the embodiments described above the electrically-adjustable light transmitter is an electrochromic device as depicted in FIG. 2. Alternate embodiments can use other electrically-actuated light transmissive materials such as PLZT, which are able to turn opaque in less than 150 microseconds. Other technologies that can be used with the apparatus and method described above, and which are considered herein to be at least functionally equivalent to an electrochromic device, include suspended particle devices, liquid crystal, and reflective hydride devices. The term, "electrically-adjustable light transmitter" should therefore be construed to include an electrochromic device, suspended particle devices, liquid crystal devices, reflective hydride and PLZT.

The navigation system used in the preferred embodiment is a global positioning system or GPS. Alternate embodiments can use other navigation systems such as the GLONASS (Global Navigation Satellite System) system or by the triangulation of received radio frequency signals such as those broadcast from local cellular towers.

The foregoing description is for purposes of illustration only. The true scope of the invention is set forth in the appurtenant claims.

The invention claimed is:
1. A window comprising:
    an electrochromic device attached to a side of at least one glass panel, the electrochromic device being configured to change a light transmissivity responsive to an electric signal provided to the electrochromic device; and
    a controller coupled to the electrochromic device, the controller being configured to control the electric signal provided to the, electrochromic device responsive to a geographic location of the window.
2. The window of claim 1, wherein the electrochromic device is sandwiched between two glass panels.

3. The window of claim 1, further comprising:
a navigation system coupled to the controller and, configured to provide a determined geographic location to the controller.

4. The window of claim 3, wherein the navigation system is a satellite positioning system.

5. The window of claim 3, wherein the navigation system is configured to determine location by triangulation of received radio frequency signals.

6. The window of claim 3, further comprising:
a data base of window tinting rules, the data base being accessible to the controller and used by said controller to determine whether to change the electric signal provided to said electrochromic device.

7. The window of claim 6, further comprising:
a. wherein the controller is configured to:
obtain a location from the navigation system;
locate a rule in the data base, governing window tinting for the geographic location obtained from the navigation system; and
adjust the electric signal provided to the electrochromic device responsive to the identified rule such that the transmissivity of the electrochromic device effectuates a window tinting that is at least substantially compliant with the located rule.

8. The window of claim 1, further comprising:
photo sensor coupled to the controller and configured to determine an ambient light level; and
wherein the controller is additionally configured to
adjust the electric signal provided to the electrochromic device responsive to the determined ambient light level.

9. The window of claim 1, further comprising:
temperature sensor coupled to the controller and configured to determine an ambient temperature; and
wherein the controller is configured to adjust the electric signal provided to the electrochromic device responsive to the ambient temperature.

10. The window of claim 1, wherein the controller is configured to receive a user input signal and adjust the electric signal responsive to the received input.

11. A geographic location-responsive tinting window comprising:
navigation system, configured to determine a geographic location;
a controller coupled to the navigation system;
a glass window panel;
an electrochromic device applied to the glass window and coupled to the controller, the electrochromic device being configured to change light transmissivity responsive to an electric signal received from the controller, the electric signal received by the electrochromic device being determined responsive to a geographic location received by the controller; and
a data base of window tinting rules for a plurality of jurisdictions, the data base being accessible to the controller;
wherein the controller is configured to receive a location from the navigation system, determine whether the location is within a jurisdiction having a window tinting rule, and, if a window tinting rule for the jurisdiction is located in the data base, adjust the electric signal provided to the electrochromic device responsive to the window tinting rule for the jurisdiction.

12. The window of claim 11, wherein the electrically-adjustable light transmitter is an electrochromic device sandwiched between two glass window panels.

13. The window of claim 11, wherein the navigation system is a satellite positioning system.

14. The window of claim 11, wherein the navigation system is configured to determine location by triangulation of received radio frequency signals.

15. The window of claim 11, wherein the controller is configured to receive a user input signal and, adjust the electric signal responsive to the received input.

16. The window of claim 11, further comprising:
a. photo sensor coupled to the controller and configured to determine an ambient light level; and
b. wherein the controller is configured to
i. adjust the electric signal provided to the electrochromic device responsive to the ambient light level.

17. A method of adjusting a window tint responsive to a geographic location, the method comprising:
obtaining a geographic location;
providing a first electrical signal to an electrochromic device which is attached to at least one glass panel and which is configured to change a light transmissivity responsive to the provided electric signal, the first electrical signal being received from a controller, which receives data corresponding to the geographic location;
obtaining a window tinting rule, from a data base of window tinting rules for a plurality of jurisdictions, the data base being accessible to the controller.

18. The method of claim 17, wherein the step of providing a first electrical signal is comprised of providing the first electrical signal to an electrochromic device sandwiched between two glass window panels.

19. The method of claim 17, wherein the step of obtaining a geographic location is comprised of at least one of:
receiving the location from a satellite positioning system; and
triangulation of received radio frequency signals.

20. The method of claim 17, further comprising the step of:
providing a second electrical signal to the electrochromic device responsive to an input to the controller by a user.

21. The window of claim 17, further comprising the steps of:
receiving a signal from a photo sensor and which corresponds to an ambient light level measured by the photo sensor; and
adjusting the source of electric charge provided to the electrochromic device responsive to the signal from the photo sensor.

22. An electrically-powered vehicle comprising:
an electrochromic device attached to a window of the electrically-powered vehicle, the electrochromic device configured to change a light transmissivity responsive to an electric signal; and
a controller coupled to the electrochromic device and configured to control the electric signal provided to the electrochromic device responsive to at least one of: a geographic location of the vehicle and an interior cabin temperature of the vehicle.

* * * * *